US009489667B2

(12) United States Patent
Etzion

(10) Patent No.: US 9,489,667 B2
(45) Date of Patent: Nov. 8, 2016

(54) SYSTEMS FOR COLLECTING RETAILER-SPECIFIC DATA

(71) Applicant: My Opine LLC, Miami Beach, FL (US)

(72) Inventor: Rafael Etzion, Miami Beach, FL (US)

(73) Assignee: MyOpine, LLC, Miami Beach, FL (US)

( * ) Notice: Subject to any disclaimer, the term of this patent is extended or adjusted under 35 U.S.C. 154(b) by 0 days.

(21) Appl. No.: 14/474,046

(22) Filed: Aug. 29, 2014

(65) Prior Publication Data
US 2016/0063469 A1    Mar. 3, 2016

(51) Int. Cl.
G06Q 40/00  (2012.01)
G07D 11/00  (2006.01)
G07F 19/00  (2006.01)
G06Q 20/20  (2012.01)
G07G 5/00  (2006.01)
G06Q 30/06  (2012.01)
G06Q 20/32  (2012.01)

(52) U.S. Cl.
CPC ........ *G06Q 20/202* (2013.01); *G06Q 20/3276* (2013.01); *G06Q 30/0635* (2013.01); *G07G 5/00* (2013.01)

(58) Field of Classification Search
CPC ............. G06F 17/30879; G06F 17/30876; G06Q 20/20; G06Q 30/02; G06Q 30/0203; G07G 5/00
USPC ..................... 235/379–380, 462.01
See application file for complete search history.

(56) References Cited

U.S. PATENT DOCUMENTS

| | | |
|---|---|---|
| 4,954,699 A | 9/1990 | Coffey et al. |
| 8,231,047 B2 | 7/2012 | Canora |
| 8,234,627 B2 | 7/2012 | Floyd et al. |
| 8,346,600 B2 | 1/2013 | Quinlan et al. |
| 8,413,882 B1 | 4/2013 | Nidamarthi et al. |
| 8,444,048 B1 | 5/2013 | Nidamarthi et al. |
| 8,504,410 B2 | 8/2013 | Pasta |
| 8,527,307 B2 | 9/2013 | Hamilton, II et al. |
| 8,595,061 B2 | 11/2013 | Falk et al. |
| 2001/0037206 A1* | 11/2001 | Falk et al. ................... 705/1 |
| 2009/0248532 A1* | 10/2009 | Sugiura ................... 705/24 |
| 2013/0191180 A1 | 7/2013 | Teo et al. |
| 2013/0282458 A1 | 10/2013 | Roberts et al. |
| 2014/0032347 A1 | 1/2014 | Argue et al. |
| 2014/0222545 A1* | 8/2014 | Hajji ................... 705/14.38 |
| 2014/0231502 A1* | 8/2014 | Marsico et al. ............. 235/375 |
| 2014/0337098 A1* | 11/2014 | Ganesh et al. ............. 705/7.32 |

FOREIGN PATENT DOCUMENTS

JP    2010277290 A  * 12/2010

* cited by examiner

*Primary Examiner* — Laura Gudorf
(74) *Attorney, Agent, or Firm* — Ntellect Law, P.C.

(57) ABSTRACT

A purchaser can provide retailer-specific feedback using a retailer-specific machine executable code printed on a transaction document at a retailer. In an embodiment, a system may include a server subsystem and at least one point-of-sale (POS) subsystem. The POS subsystem may include a processor module configured to provide instruction to a printing terminal for printing, at the respective retailer, a retailer-specific machine readable code on a transaction document associated with a purchase order. The retailer-specific machine readable code may include a decodable instruction for interacting with a server module of the server subsystem to access an electronic platform configured to provide a respective retailer-specific request for information.

15 Claims, 3 Drawing Sheets

008# SYSTEMS FOR COLLECTING RETAILER-SPECIFIC DATA

TECHNICAL FIELD

This disclosure generally relates to systems for retail processing systems, and, more specifically, systems for processing a purchase order and collecting retailer-specific data.

BACKGROUND

Retailers may collect data from the purchases for various reasons, including customer service, satisfaction determination, or other reasons. Surveys and questionnaires have been used by various businesses to determine the opinions of consumers on various subject matters. For example, businesses have attempted to poll consumers' satisfaction on product offerings, quality, and pricing. Consumers' retail experience, such as customer service, retail environment, and delivery of products or services, also provides valuable insights for formulating business strategy.

Surveys and questionnaires can be provided verbally by a marketer through in-person encounters with the customer or through marketing calls, and the responses can be recorded by the marketer. Surveys and questionnaires can be provided on paper through mail. However, with the advance of electronic technologies, electronic surveys and questionnaires can provide greater efficiency if the systems for delivering the electronics surveys and questionnaires are designed to allow for easy user participation.

SUMMARY

An embodiment of a point-of-sale (POS) system of the present disclosure is operable to process a purchase order at a retailer. The POS system may include an order input interface configured to receive, at the retailer, the purchase order. The POS system may further include a processor module in communication with the order input interface, and a printing terminal in communication with the processor module. The processor module may be configured to provide instruction to the printing terminal for printing, at the retailer, a retailer-specific machine readable code on a transaction document associated with the purchase order. The retailer-specific machine readable code may include a decodable instruction for interacting with the processor module to access an electronic platform configured to provide a retailer-specific request for information. In an embodiment, the processor module is configured to receive response data responsive to the retailer-specific request for information and associate the response data with the retailer.

An exemplary embodiment of a system of the present disclosure is operable to process a purchase order and collect response data. The system may include a point-of-sale (POS) subsystem located at a first retailer and a server subsystem. The POS subsystem may include an order input interface configured to receive the purchase order at the first retailer, a processor module in communication with the order input interface, and a printing terminal in communication with the processor module, wherein the processor module is configured to provide instruction to the printing terminal for printing, at the first retailer, a retailer-specific machine readable code on a transaction document associated with the purchase order. The server subsystem may include a server module configured to provide an electronic questionnaire. In an embodiment, the retailer-specific machine readable code includes a decodable instruction for interacting with the server module to access the electronic questionnaire, and the server module is configured to receive response data for the electronic questionnaire.

An exemplary embodiment of a system of the present disclosure is operable to process purchase orders at a plurality of retailers and collect retailer-specific response data. The system may include a plurality of point-of-sale (POS) subsystems each located at a respective retailer and a server subsystem. The plurality of POS subsystems each may include an order input interface configured to receive a purchase order at the respective retailer, a processor module in communication with the order input interface, and a printing terminal in communication with the processor module. The processor module may be configured to provide instruction to the printing terminal for printing, at the respective retailer, a retailer-specific machine readable code on a transaction document associated with the purchase order. The server subsystem may include a server module. In an embodiment, the retailer-specific machine readable code comprises a decodable instruction for interacting with the server module to access an electronic platform configured to provide a respective retailer-specific request for information, and the server module is configured to receive response data responsive to the respective retailer-specific request for information and associate the response data with the retailer.

These and other advantages of the present disclosure will become apparent to those skilled in the art from the following detailed description, the accompanying drawings, and the appended claims.

DETAILED DESCRIPTION

Figure 1:
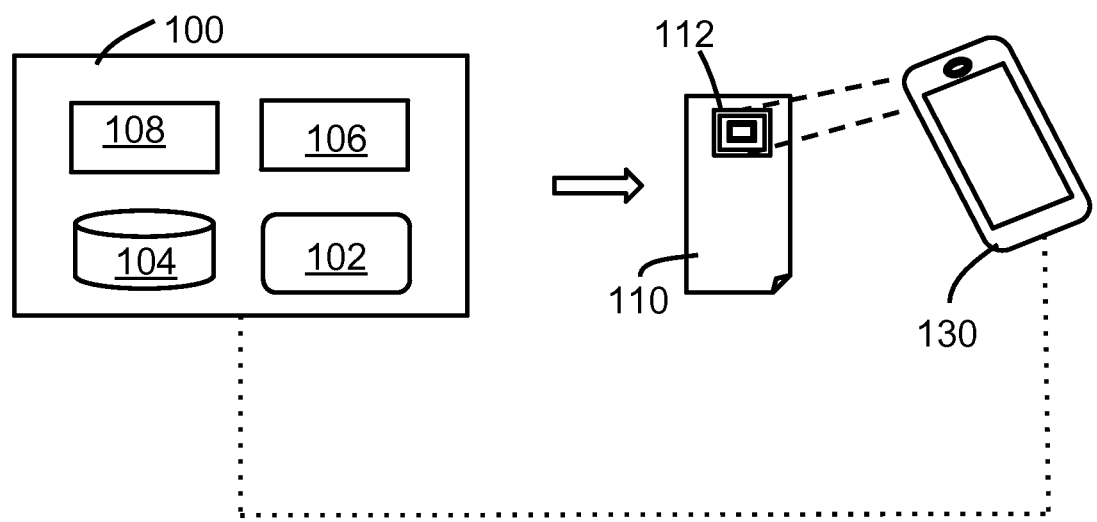
FIG. 1 is a schematic diagram illustrating an exemplary embodiment of a POS system, in accordance with the present disclosure.

Example embodiments will now be described hereinafter with reference to the accompanying drawings, which form a part hereof, and which illustrate example embodiments which may be practiced. As used in the disclosures and the appended claims, the terms "embodiment", "example embodiment", and "exemplary embodiment" do not necessarily refer to a single embodiment, although they may, and various example embodiments may be readily combined and interchanged, without departing from the scope or spirit of example embodiments. Furthermore, the terminology as used herein is for the purpose of describing example embodiments only and is not intended to be limitations. In this respect, as used herein, the term "in" may include "in" and "on", and the terms "a," "an" and "the" may include singular and plural references. Furthermore, as used herein, the term "by" may also mean "from", depending on the context. Furthermore, as used herein, the term "if" may also mean "when" or "upon," depending on the context. Furthermore, as used herein, the words "and/or" may refer to and encompass any and all possible combinations of one or more of the associated listed items.

The systems and methods disclosed herein make it possible to provide a retailer-specific request for information to confirmed purchasers and collect response data with minimized hassles. In some embodiments, systems and methods in accordance with the present disclosure allow for the collection of retailer-specific data from confirmed purchasers without requiring the purchasers to provide identifying information about themselves or their contact information, such as e-mails, phone number, or address or to go through a verification process, such as providing an order ticket number.

Retailer-specific data from confirmed purchasers can be very helpful to a retail business in evaluating its retail operation. A business may determine what is helping it attracting purchasers and what needs to be improved upon to bring back repeat purchasers.

Various public forums and online websites are available to serve as a platform for the general public to provide reviews and feedbacks on various businesses and products. Such public forums and online websites, however, allow anyone in the public to write a review without verifying whether the reviewer is an authentic purchaser. For this reason, public reviews are often biased and unreliable. Accordingly, there is a need for a system to collecting data directly from confirmed purchasers.

One approach is described in U.S. Pat. App. Pub. No. 2013/0191180 to Teo et al. Teo teaches a system for collecting consumer feedback pertaining to particular products and services using a unique product code (UPC). Each product or service includes a UPC that is unique with respect to the other products and services. The UPC is found either on the product itself or on a pre-printed display that visually associates a UPC with a service. An online survey site can be encoded in the UPC, and the consumer can scan the UPC from the product or the pre-printed display for each product or service purchased and be taken to the online survey site for each product or service.

One limitation of Teo's UPC-based system is that its feedback collection is limited to feedbacks pertaining to the product or services itself; the collection of retailer-specific data would not be possible with Teo's UPC-based system. Teo encodes the online survey site into the UPC but in doing so, Teo would collect feedbacks on the same product sold in different retailers because the same products all have the same UPC. As such, the online survey site would be product-specific, but not retailer-specific.

Another limitation of Teo's UPC-based system is that it would allow potentially biased non-purchasers to access the online survey site. Products in a customary retail environment are placed in publically accessible space, such as open shelves, so as to allow the consumers to browse the products. As such, anyone in the public may pick up the product and scan the UPC to access the online survey site without actually purchasing and using the products. Non-purchaser participation is especially an issue when an incentive is provided to participate in the survey. For example, producers have offered raffle tickets as an incentive for participating in a survey, but due to legal restrictions, purchase cannot be required. Such a survey would not be reliable as non-purchasers are actually incentivized to participate.

Yet another limitation of Teo's UPC-based system is that a consumer would have to go through unnecessary hassles and may be deterred from participating in the online survey. If the consumer purchased multiple products, the consumer would be required by Teo's UPC-based system to scan multiple UPCs and access multiple online survey sites. While this process may not be highly complicated, it is repetitive and involves more hassles than necessary. For purchasers who have no other motivation except his generosity to participate in feedback collection, the unnecessary hassles would make it less likely that the unmotivated purchasers would go through with the online survey. Additionally, the use of UPC on the product or on a pre-printed display creates even more hassle for the consumer. This is especially the case for a pre-printed display because the consumer cannot bring along the pre-printed display after purchase and thus cannot wait until a more convenient time later to scan the UPC; the consumer would be forced to respond before the product is consumed or service is received. Some products also may not be conveniently carried, and the consumer may not have the product to scan the UPC when it is a convenient to do so.

FIG. 1 is a schematic diagram illustrating a point-of-sale (POS) system 100 operable to collect retailer-specific data directly from the purchaser anytime after purchase without requiring the purchaser's contact information or a verification process. An exemplary embodiment of the POS system 100 includes a processor module 102, an optional memory module 104 communicatively connected with the processor module 102, an input interface 106 communicatively connected with the processor module 102, and a printing terminal 108 communicatively connected with the process or module 102. The POS system 100 may be located at a retailer for goods or services, such as a supermarket, theater, auto-repair shop, bank, dry-cleaner, etc.

The processor module 102 may include one processor or computer or a plurality of processors or computers. The memory module 104 may include one memory element or a plurality of memory elements. The processor module 102 and memory module 104 may be implemented using a distributed computing environment or cloud computing environment.

In an embodiment, the POS system 100 may be configured to process a purchase order at the retailer, which may be any entity that provides services or goods. A purchase order may be any business transaction at the retailer, including both free and paid business transactions. For example, a purchase order may be a purchase of goods at a supermarket, a purchase of a movie ticket and the subsequent showing of the movie at a theater, a purchase of car maintenance or repair service, a financial transaction (e.g., deposit or withdrawal of funds), or a purchase of dry cleaning service.

The input interface 106 may be configured to receive the purchase order at the retailer, and the processor module 102 may optionally be configured to generate order data related to the purchase order. The memory module 104 may optionally be configured to receive and store the order data. The order data may include a variety of information about the purchase order relevant to retail operation, such as the products or services ordered, data, time, price, payment method, etc.

In operation, a purchaser may place an order with an operator (not shown) of the POS system 100, and the operator may enter the purchase order into the POS system 100 through the input interface 106. Alternatively, in a self-service retail environment, the purchaser may place the order through the input interface 106.

In addition to the purchase order, the operator may optionally collect the purchaser's contact information and enter it into the POS system 100 through the input interface 106. Alternatively, in a self-service retail environment, the purchaser may optionally enter his contact information through the input interface 106. The purchaser's contact information may optionally be processed by the processor module 102 and stored in the memory module 104. It is to be appreciated that the collection of purchaser contact information is optional, and in some embodiments, POS system 100 may be configured without this functionality.

In an embodiment, the processor module 102 is configured to provide instruction to the printing terminal 108 for printing, at the retailer, a retailer-specific machine readable code 112 on a transaction document 110 associated with the purchase order. The transaction document 110 may be any document that a retailer might provide to the purchaser to memorialize the purchase order, such as a receipt, order confirmation print out, or retail contracts/agreements (e.g., rental agreement) or any document that is provided to the purchaser in the ordinary course of business (e.g, movie tickets, vouchers, etc.).

The retailer-specific machine readable code 112 may include a decodable instruction for interacting with the processor module 102 to access an electronic platform configured to provide a retailer-specific request for information. The retailer-specific code 112 may be any code known in the art that may be captured by an optical device. In an embodiment, the retailer-specific code 112 may include a bar code, such as a one-dimensional or two-dimensional bar code. The decodable instruction encoded in the retailer-specific code 112 may include a website address (e.g., URL) where the electronic platform may be accessed.

The instruction in code 112 may be decoded and executed by the purchaser's mobile computing device 130, which would allow the purchaser to interact with the processor module 102 to access an electronic platform. The purchaser's mobile computing device 130 may include but not limited to a smart phone, a PDA, a laptop computer, or any other suitable devices that would allow the purchaser to decode the retailer-specific code 112. To decode the code 112, the purchaser's mobile computing device 130 may include commercially available software or software provided by the retailer. The software may be, not is not limited to, a mobile device application or a computer program.

In an embodiment, the mobile computing device 130 may interact with the processor module 102 using any communication protocol known in the art. In an exemplary embodiment, the mobile computing device 130 and the processor module 102 may communicate using a remote access protocol known in the art. In another exemplary embodiment, the mobile computing device 130 and the processor module 102 may communicate using a "pull" protocol known in the art. The electronic platform may be accessed by the mobile computing device 130 in different ways. In an embodiment, the mobile computing device 130 may include a browser to access the electronic platform using a remote access protocol. In another embodiment, the mobile computing device 130 may include a mobile application and access the electronic platform by hosting it, either partially or entirely, on the mobile computing device 130.

In an embodiment, the mobile computing device 130 is further configured to allow the purchaser to provide the response data to the processor module 102. The response data may include customized response typed in by the purchaser or the purchaser's choice of preset options in the retailer-specific request for information.

The processor module 102 may be further configured to receive response data responsive to the retailer-specific request for information and associate the response data with the retailer. The response data may optionally be stored in the optional memory module 104 for future access. In an embodiment, the processor module 102 may be further configured to associate the response data with the order data if available.

One of ordinary skill in the art would appreciate that the retailer-specific code 112 may be a unique code for a retailer having one or a plurality of points of sale either at the same location or different locations. In an embodiment, each point of sale may be considered as a different retailer and would have a different retailer-specific code 112. In this case, the feedback from the purchaser would reflect the retail experience at each particular point of sale. In another embodiment some or all points of sale of a retailer may be considered as a single retailer and would have the same retailer-specific code 112. In this case, the feedback from the purchaser would reflect the retail experience at the retailer without differentiating the different points of sale of the retailer.

For example, a department store may have a plurality of points of sale at the same location. In an exemplary embodiment, a different retailer-specific code 112 may be assigned to each point of sale. In another exemplary embodiment, the same retailer-specific code 112 may be assigned to a group or all of the points of sale. For example, each floor or each department of the department store may be assigned the same retailer-specific code 112.

One of ordinary skill in the art would also appreciate that the retailer-specific request for information may be presented in various forms depending on the purpose for the information requested. In an embodiment, the retailer-specific request for information may include a customized questionnaire. In an embodiment, the retailer-specific request for information may include a blank or partially-filled fillable form. In an exemplary, the retailer-specific request for information may include a menu of preset response options. The use of retailer-specific code 112 allows for a number of customizations of the questions, including but not limiting to customization based on retailers or retailer locations.

It is to be appreciated that printing the retailer-specific code 112 on the transaction document 110 at the retailer ensures that only the actual purchaser would receive the retailer-specific code 112 without the hassle of collecting purchaser's contact information. Collecting the purchaser's contact information may cause a delay in retail operation, and, due to privacy concerns or the inconvenience involved, a purchaser may decline to provide contact information. The transaction document 110 comprising the retailer-specific code 112 allows for a convenient vehicle for the purchaser to keep the retailer-specific code 112 with him for accessing the electronic platform at a convenient time.

In some embodiments, the retailer-specific code 112 may be also transaction-specific such that a different code 112 may be assigned to each transaction. For example, not only different codes 112 may be assigned to different retailers, the different transactions at the same retailers may also be assigned different codes 112. The use of a code 112 that is both retailer-specific and transaction-specific may have particular synergy in embodiments in which order data is collected as discussed above. In an exemplary embodiment, the transaction-specific and retailer-specific code 112 may include a decodable instruction for interacting with the processor module 102 to access an electronic platform configured to provide a transaction-specific and retailer-specific request for information. The use of the transaction-specific and retailer-specific code 112 allows for a number of customizations of the transaction-specific and retailer-specific request for information based on the order data. This customization of the transaction-specific and retailer-specific request for information may be used in a customer service context in which the request for information may be a form that is prefilled fully or partially.

An example is provided herein to illustrate an exemplary operation of the POS system 100. In an exemplary embodiment, a purchase order of a car rental may be processed by the POS system 100 at a car rental agency. Order data, such as the rental car license plate, make/model, or color, may be optionally generated by the processor module 102 and stored in the optional memory module 104. The processor module 102 may instruct the printing terminal 108 to print a transaction-specific and retailer-specific code 112 on the leasing agreement 110. Using a mobile computing device 130, the purchaser may capture and decode the code 112 to access an electronic platform configured to provide a transaction-specific and retailer-specific request for information. The electronic platform may be accessed from the mobile computing device 130 using a browser or other suitable software. The request for information may include a form prefilled using the order data and a preset option for confirming the prefilled data is correct. The purchaser may send a response data to the processor module 102 by choosing the preset option to verify. Upon verification, a customer service event may be initiated, such as, locating the rental car via GPS and sending verified order data to a road side assistance responder for road side service at the rental car location.

One of ordinary skill in the art would appreciate the efficiency in customer service that may be realized by the synergistic use of the retailer-specific and transaction-specific code 112 in embodiments in which order data is generated. In an aspect, the transaction-specific code 112 allows for reduced errors in written and oral communications between the purchaser and the retailer while customer service is being delivered. Also it improves the time and accuracy of providing customer service.

Figure 2:
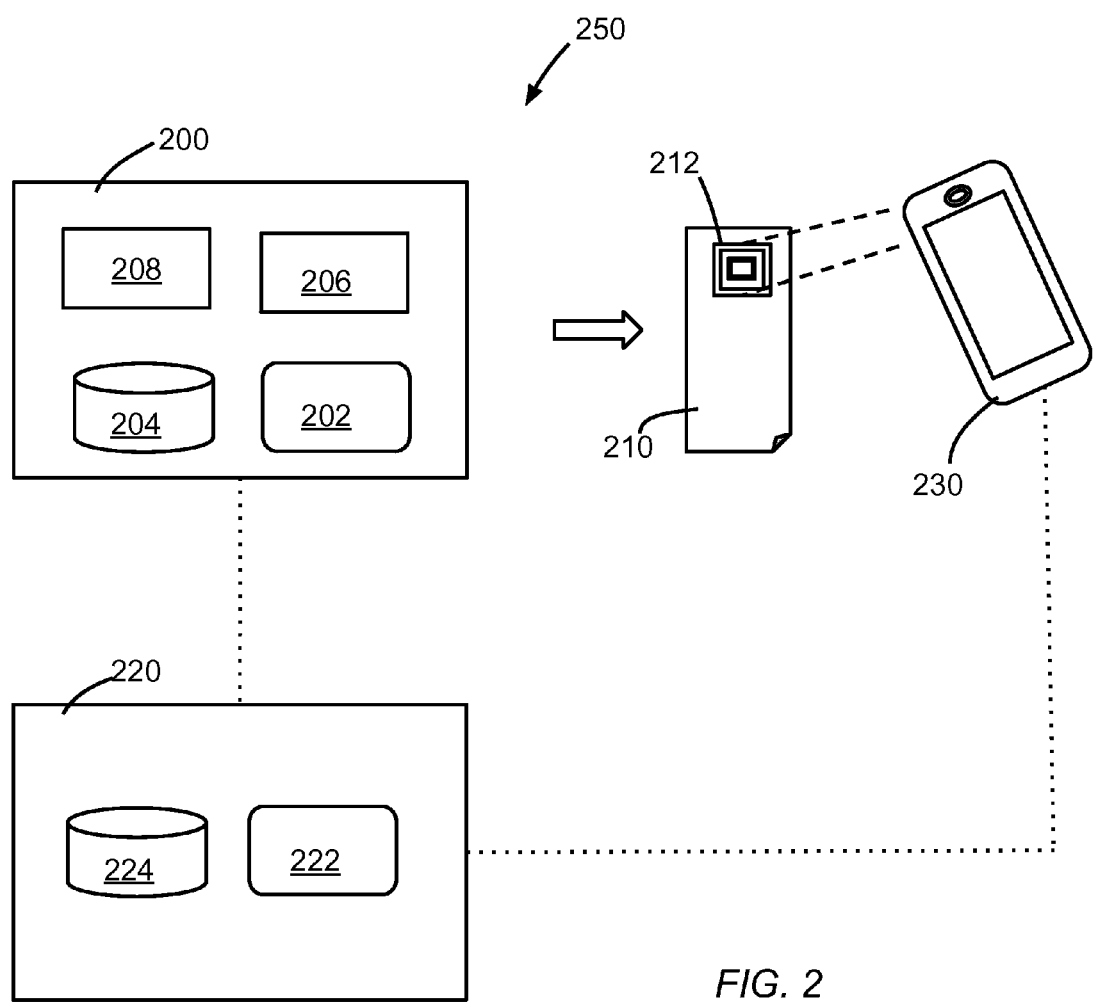
FIG. 2 is a schematic diagram illustrating an exemplary embodiment of a system comprising a POS subsystem and a server subsystem, in accordance with the present disclosure.

FIG. 2 is a schematic diagram illustrating a system 250 operable to process purchase orders and collect response data. The system 250 includes a point-of-sale (POS) subsystem 200 located at a retailer and a server subsystem 220.

An exemplary embodiment of the POS subsystem 200 includes a processor module 202, an optional memory module 204 communicatively connected with the processor module 202, an input interface 206 communicatively connected with the processor module 202, and a printing terminal 208 communicatively connected with the processor module 202. Similar to the POS system 100, the POS subsystem 200 may be located at a retailer for goods or services, such as a supermarket, theater, auto-repair shop, bank, dry-cleaner, etc. The processor module 202 may include one processor or computer or a plurality of processors or computers. The optional memory module 204 may include one memory element or a plurality of memory elements. The processor module 202 and optional memory module 204 may be implemented using a distributed computing environment or cloud computing environment.

An exemplary embodiment of the server subsystem 220 includes a server module 222 and an optional memory module 224 in communication with the server module 222. The server subsystem 220 may be located remotely away from the retailer in one or more locations or in the Cloud. In an embodiment, the server module 222 may actually be a set of networked servers, but is shown in FIG. 2 as a single server for illustration purposes only. The optional memory module 224 may include one memory element or a plurality of memory elements.

The server subsystem 220 and the POS subsystem 200 may be communicatively connected over a wide area network (WAN), local area network (LAN), optic fiber, cable channel, satellite network, cellular network, radio network, infrared link, the Cloud, the Internet, or any other wired or wireless communication connection known in the art.

In an embodiment, the POS subsystem 200 may be configured to process a purchase order at the retailer, which may be any entity that provides services or goods. A purchase order, as described above with respect to the POS systems 100, may be any business transaction at the retailer, including both free and paid business transactions. For example, a purchase order may be a purchase of goods at a supermarket, a purchase of a movie ticket and the subsequent showing of the movie at a theater, a purchase of car maintenance or repair service, a financial transaction (e.g., deposit or withdrawal of funds), or a purchase of dry cleaning service.

The input interface 206 may be configured to receive the purchase order at the retailer, and the processor module 202 may optionally be configured to generate order data related to the purchase order. In an embodiment, the memory module 204 may optionally be configured to receive and store the order data. The order data may include a variety of information about the purchase order relevant to retail operation, such as the products or services ordered, data, time, price, payment method, etc. In another embodiment, the order data may be transmitted to the server subsystem 220, in which the memory module 224 optionally be configured to receive and store the order data.

In operation, a purchaser may place an order with an operator (not shown) of the POS subsystem 200, and the operator may enter the purchase order into the POS subsystem 200 through the input interface 206. Alternatively, in a self-service retail environment, the purchaser may place the order through the input interface 206.

In addition to the purchase order, the operator may optionally collect the purchaser's contact information and enter it into the POS subsystem 200 through the input interface 206. Alternatively, in a self-service retail environment, the purchaser may optionally enter his contact information through the input interface 206. In an embodiment, the purchaser's contact information may optionally be processed by the processor module 202 and stored in the memory module 204. In another embodiment, the purchaser's contact information may optionally be processed by the processor module 202 and transmitted to the server subsystem 220, in which the purchaser's contact information may be stored in the optional memory module 224. It is to be appreciated that the collection of purchaser contact information is optional, and in some embodiments, POS subsystem 200 may be configured without this functionality.

In an embodiment, the processor module 202 is configured to provide instruction to the printing terminal 208 for printing, at the retailer, a retailer-specific machine readable code 212 on a transaction document 210 associated with the purchase order. The transaction document 210 may be any document that a retailer might provide to the purchaser in the ordinary course of business to memorialize the purchase order, such as a receipt, order confirmation print out, or retail contracts/agreements (e.g., rental agreement) or any document that is provided to the purchaser in the ordinary course of business (e.g, movie tickets, vouchers, etc.).

The retailer-specific machine readable code 212 may include a decodable instruction for interacting with the server module 222 to access an electronic platform configured to provide a retailer-specific request for information.

The retailer-specific code 212 may be any code known in the art that may be captured by an optical device. In an embodiment, the retailer-specific code 212 may include a bar code, such as a one-dimensional or two-dimensional bar code. The decodable instruction encoded in the retailer-specific code 212 may include a website address (e.g., URL) where the electronic platform may be accessed.

The instruction in code 212 may be decoded and executed by the purchaser's mobile computing device 230, which would allow the purchaser to interact with the server module 222 to access the electronic platform. The purchaser's mobile computing device 230 may include but not limited to a smart phone, a PDA, a laptop computer, or any other suitable devices that would allow the purchaser to decode the retailer-specific code 212. To decode the code 212, the purchaser's mobile computer device 230 may include commercially available software or software provided by the retailer. The software may be, not is not limited to, a mobile device application or a computer program.

In an embodiment, the mobile computing device 230 may interact with the server module 222 using any communication protocol known in the art. In an exemplary embodiment, the mobile computing device 230 and the server module 222 may communicate using a remote access protocol known in the art. In another exemplary embodiment, the mobile computing device 230 and the server module 222 may communicate using a "pull" protocol known in the art. The electronic platform may be accessed by the mobile computing device 230 in different ways. In an embodiment, the mobile computing device 230 may include a browser to access the electronic platform using a remote access protocol. In another embodiment, the mobile computing device 230 may include a mobile application and access the electronic platform by hosting it, either partially or entirely, on the mobile computing device 230.

In an embodiment, the mobile computing device 230 is further configured to allow the purchaser to provide the response data to the server module 222. The response data may include customized response typed in by the purchaser or the purchaser's choice of preset options in the electronic platform.

The server module 222 may be further configured to receive the response data responsive to the retailer-specific request for information and associate the response data with the retailer. The response data may optionally be stored in the optional memory module 224 for future access. In an embodiment, the server module 222 may be further configured to associate the response data with the order data if available.

One of ordinary skill in the art would appreciate that the retailer-specific code 212 may be a unique code for a retailer having one or a plurality of points of sale either at the same location or different locations. In an embodiment, each point of sale may be considered as a different retailer and would have a different retailer-specific code 212. In this case, the feedback from the purchaser would reflect the retail experience at each particular point of sale. In another embodiment some or all points of sale of a retailer may be considered as a single retailer and would have the same retailer-specific code 212. In this case, the feedback from the purchaser would reflect the retail experience at the retailer without differentiating the different points of sale of the retailer.

For example, a department store may have a plurality of points of sale at the same location. In an exemplary embodiment, a different retailer-specific code 212 may be assigned to each point of sale. In another exemplary embodiment, the same retailer-specific code 212 may be assigned to a group or all of the points of sale. For example, each floor or each department of the department store may be assigned the same retailer-specific code 212.

It is to be appreciated that while only one POS subsystem 200 is shown in FIG. 2, the system 250 may be adapted to include a plurality of POS subsystems.

Figure 3:
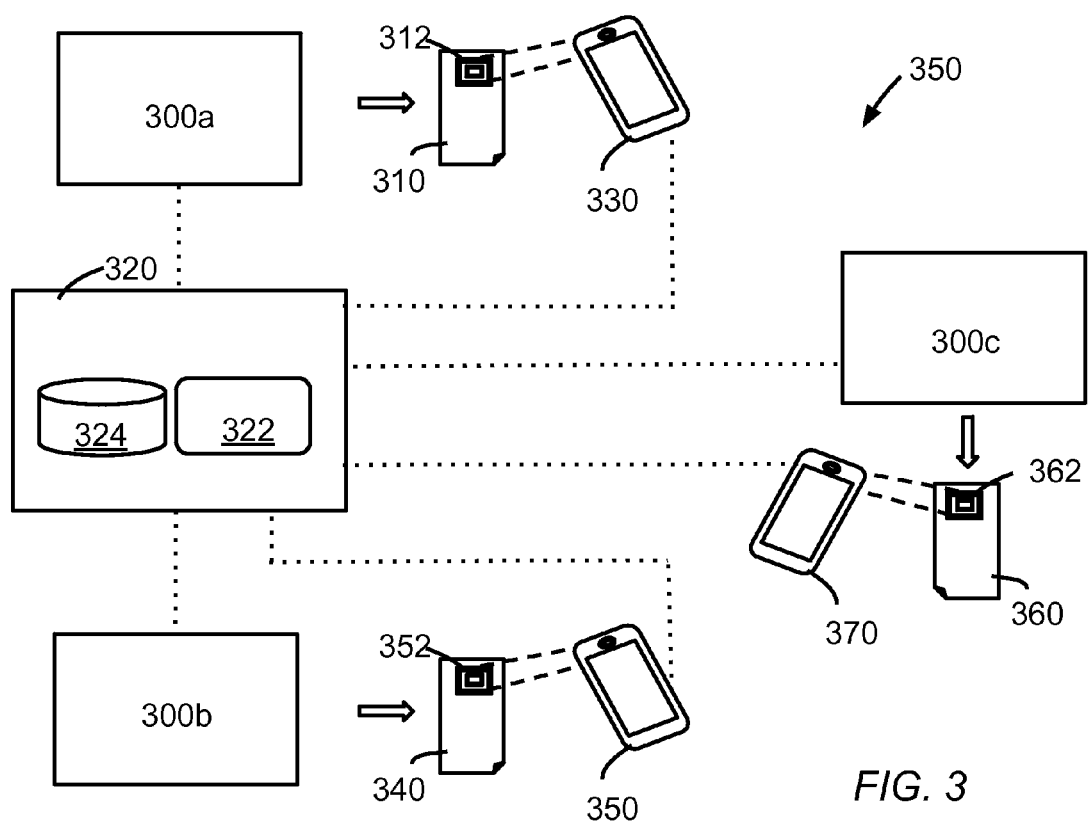
FIG. 3 is a schematic diagram illustrating an exemplary embodiment of a system comprising a plurality of POS subsystem and a server subsystem, in accordance with the present disclosure.

FIG. 3 is a schematic diagram illustrating a system 350 that is the same as the system 250 in FIG. 2 as described above except the system 350 includes a plurality of POS subsystems 300a, 300b, and 300c that are the same as the POS subsystem 200 in FIG. 2 as described above. The POS subsystems 300a, 300b, and 300c may each be located at a different retailer. Referring to FIGS. 2 and 3, the POS subsystems 300a, 300b, and 300c each may include an order input interface 206 configured to receive a purchase order at the respective retailer, a processor module 202 in communication with the order input interface 206, and a printing terminal 208 in communication with the processor module 202. The respective processor module 202 of the POS subsystems 300a, 300b, and 300c may be configured to provide instruction to the respective printing terminal 208 for printing, at the respective retailer, a retailer-specific machine readable code 312, 352, or 362 on a transaction document 310, 340, or 360 associated with the purchase order, respectively. The server subsystem 320 may include a server module 322. In an embodiment, the retailer-specific machine readable codes 312, 352, and 362 each comprise a decodable instruction for interacting with the server module 322 to access an electronic platform configured to provide a respective retailer-specific request for information. The instruction in codes 312, 352, and 362 may be decoded and executed by the purchasers' mobile computing devices 330, 350, and 370, respectively, which would allow the purchasers to interact with the respective processor module 202 of the POS subsystems 300a, 300b, and 300c to access the electronic platform. The server module 322 is configured to receive response data responsive to the respective retailer-specific requests for information from the mobile computing devices 330, 350, and 370. The server module 322 may associate the response data with the respective retail and store the response data in an optional memory module 324 of the server subsystem 320.

One of ordinary skill in the art would appreciate that, in systems 250 and 350, the retailer-specific request for information may be presented in various forms depending on the purpose for the information requested. In an embodiment, the retailer-specific request for information may include a customized questionnaire. In an embodiment, the retailer-specific request for information may include a blank or partially-filled fillable form. In an exemplary embodiment, the retailer-specific request for information may include a menu of preset response options. The use of retailer-specific codes 212, 312, 352, or 362 allow for a number of customizations of the questions, including but not limiting to customization based on retailers or retailer locations.

It is to be appreciated that printing the retailer-specific codes 212, 312, 352, or 362 on the transaction documents 210, 310, 350, or 360, respectively, at the retailers ensures that only the actual purchasers would receive the retailer-specific code codes 212, 312, 352, or 362 without the hassle of collecting purchases' contact information. Collecting the purchaser's contact information may cause a delay in retail operation, and, due to privacy concerns or the inconvenience involved, a purchaser may decline to provide contact information. The transaction documents 210, 310, 340, and 360 comprising the retailer-specific code 212, 312, 352, 362, respectively, allow for a convenient vehicle for the purchasers to keep the retailer-specific codes 212, 312, 352, or 362 with them for accessing the electronic platform at a convenient time.

In some embodiments, the retailer-specific codes 212, 312, 352, or 362 may be also transaction-specific such that a different code 212, 312, 352, or 362 may be assigned to each transaction. For example, not only different codes 212 may be assigned to different retailers, the different transactions at the same retailers may also be assigned different codes 212. The use of codes 212, 312, 352, or 362 that are both retailer-specific and transaction-specific may have particular synergy in embodiments in which order data is collected as discussed above. In an exemplary embodiment, the transaction-specific and retailer-specific code 212 may include a decodable instruction for interacting with the server module 220 to access an electronic platform configured to provide a transaction-specific and retailer-specific request for information. The use of the transaction-specific and retailer-specific code 212 allows for a number of customizations of the transaction-specific and retailer-specific request for information based on the order data. This customization of the transaction-specific and retailer-specific request for information may be used in a customer service context in which the request for information may be a form that is prefilled fully or partially.

An example is provided herein to illustrate an exemplary operation of the POS system 200. In an exemplary embodiment, a purchase order of a car rental may be processed by the POS system 200 at a car rental agency. Order data, such as the rental car license plate, make/model, or color, may be optionally generated by the processor module 202 and stored in the optional memory module 204. The processor module 202 may instruct the printing terminal 208 to print a transaction-specific and retailer-specific code 212 on the leasing agreement 210. Using a mobile computing device 230, the purchaser may scan and decode the code 212 to interface with a server module 222 and access an electronic platform configured to provide a transaction-specific and retailer-specific request for information. The electronic platform may be accessed from the mobile computing device 230 using a browser or other suitable software. The request for information may include a form prefilled using the order data and a preset option for confirming the prefilled data is correct. The purchaser may send a response data to the server module 222 by choosing the preset option to verify. Upon verification, a customer service event may be initiated, such as, locating the rental car via GPS and sending the verified order data to a road side assistance responder for road side service at the rental car location.

One of ordinary skill in the art would appreciate the improvement in customer service that may be realized by the synergistic use of the retailer-specific and transaction-specific code 212, 312, 352, or 362 in embodiments in which order data is generated. In an aspect, the transaction-specific code 212 allows for reduced errors in written and oral communications between the purchaser and the retailer while customer service is being delivered. Also it improves the time and accuracy of providing customer service.

While various embodiments in accordance with the disclosed principles have been described above, it should be understood that they have been presented by way of example only, and are not limiting. Thus, the breadth and scope of the example embodiments described herein should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

For example, as referred to herein, a computing device, communication device, or capturing device may be a virtual machine, computer, node, instance, host, or machine in a networked computing environment. Also as referred to herein, a network or cloud may be a collection of machines connected by communication channels that facilitate communications between machines and allow for machines to share resources. Network may also refer to a communication medium between processes on the same machine. Also as referred to herein, a network element, node, or server may be a machine deployed to execute a program operating as a socket listener and may include software instances.

Resources may encompass any types of resources for running instances including hardware (such as servers, clients, mainframe computers, networks, network storage, data sources, memory, central processing unit time, scientific instruments, and other computing devices), as well as software, software licenses, available network services, and other non-hardware resources, or a combination thereof.

A network or cloud may include, but is not limited to, computing grid systems, distributed computing environments, cloud computing environment, etc. Such network or cloud includes hardware and software infrastructures configured to form a virtual organization comprised of multiple resources which may be in geographically disperse locations.

Although various computer elements, communication devices and capturing devices have been illustrated herein as single device or machine, such elements may operate over several different physical machines, or they may be combined as operating code instances running on a single physical machine. The claims in the present application comprehend such variation in physical machine configurations.

Various terms used herein have special meanings within the present technical field. Whether a particular term should be construed as such a "term of art," depends on the context in which that term is used. "Connected to," "in communication with," or other similar terms should generally be construed broadly to include situations both where communications and connections are direct between referenced elements or through one or more intermediaries between the referenced elements, including through the Internet or some other communicating network. "Network," "system," "environment," and other similar terms generally refer to networked computing systems that embody one or more aspects of the present disclosure. These and other terms are to be construed in light of the context in which they are used in the present disclosure and as those terms would be understood by one of ordinary skill in the art would understand those terms in the disclosed context. The above definitions are not exclusive of other meanings that might be imparted to those terms based on the disclosed context.

Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result. Words relating to relative position of elements such as "about," "near," "proximate to," and "adjacent to"

shall mean sufficiently close to have a material effect upon the respective system element interactions.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any invention(s) in this disclosure. Neither is the "Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. A point-of-sale (POS) system operable to process a purchase order at a retailer, comprising:
    an order input interface configured to receive, at the retailer, the purchase order;
    a processor module in communication with the order input interface; and
    a printing terminal in communication with the processor module;
    wherein the processor module is configured to provide instruction to the printing terminal for printing, at the retailer, a retailer-specific machine readable code on a transaction document associated with the purchase order;
    wherein the retailer-specific machine readable code comprises a decodable instruction for a mobile device to interact with the processor module to access an electronic platform using a remote access protocol, the electronic platform configured to provide a retailer-specific questionnaire; and
    wherein the processor module is configured to receive response data responsive to the retailer-specific questionnaire and associate the response data with the retailer.

2. The system of claim 1, wherein the POS system further comprises a memory module in communication with the processor module, the memory module being configured to store the response data.

3. The system of claim 2, wherein the processor module is configured to generate order data based on the purchase order received at the order input interface, and the memory module is configured to store the order data.

4. The system of claim 3, wherein the processor module is configured to associate the order data and the response data.

5. The system of claim 2, wherein the memory module comprises at least one memory element.

6. The system of claim 1, wherein the processor module comprises at least one processor.

7. The system of claim 1, wherein the processor module comprises a network of processors connected by a local area network (LAN).

8. A system operable to process a purchase order and collect retailer-specific response data, the system comprising:
    a point-of-sale (POS) subsystem located at a first retailer, the POS subsystem comprising:
        an order input interface configured to receive the purchase order at the first retailer;
        a processor module in communication with the order input interface; and
        a printing terminal in communication with the processor module, wherein the processor module is configured to provide instruction to the printing terminal for printing, at the first retailer, a retailer-specific machine readable code on a transaction document associated with the purchase order;
    a server subsystem comprising a server module;
    wherein the retailer-specific machine readable code comprises a decodable instruction for a mobile device to interact with the server module to access an electronic platform using a remote access protocol, the electronic platform configured to provide a retailer-specific questionnaire;
    wherein the server module is configured to receive response data responsive to the retailer-specific questionnaire and associate the response data with the retailer.

9. The system of claim 8, wherein the decodable instruction comprises a uniform resource locator (URL).

10. The system of claim 8, wherein the server module comprises at least one processor.

11. The system of claim 10, wherein the at least one processor is cloud-based.

12. The system of claim 8, wherein the server subsystem further comprises a memory module configured to store the response data.

13. The system of claim 12, wherein the memory module comprises at least one memory element.

14. The system of claim 12, wherein the at least one memory element is cloud-based.

15. The system of claim 8, wherein the server subsystem is configure to communicate with the POS system over a wide area network (WAN).

* * * * *